United States Patent [19]

Zurko

[11] 4,016,914
[45] Apr. 12, 1977

[54] SELF-LOCKING PANEL FASTENER

[76] Inventor: Mieczyslaw J. Zurko, 64 Dutch Drive, Holland, Pa. 18966

[22] Filed: June 26, 1975

[21] Appl. No.: 590,652

[52] U.S. Cl. .......................... 151/41.76; 24/211 N; 52/127; 52/708; 85/5 B; 151/69; 403/20
[51] Int. Cl.² ........................................ F16B 39/22
[58] Field of Search ................ 151/6, 24, 25 C, 9, 151/41.76; 85/5 B, 32 K; 24/211 N, 221 A; 403/406, 408; 52/758 D

[56] References Cited

UNITED STATES PATENTS

| | | | |
|---|---|---|---|
| 2,414,272 | 1/1947 | Poupitch | 24/221 A |
| 2,758,625 | 8/1956 | Poupitch | 151/6 |
| 2,817,135 | 12/1957 | Harris et al. | 24/221 A |
| 2,906,311 | 9/1959 | Boyd | 85/5 B X |
| 2,907,418 | 10/1959 | Hudson et al. | 24/221 A X |
| 2,984,884 | 5/1961 | Chapman et al. | 85/5 B X |
| 3,052,940 | 9/1962 | Sellers | 85/5 B X |
| 3,117,484 | 1/1964 | Myers | 85/5 B |
| 3,180,390 | 4/1965 | Ockert | 85/5 B X |
| 3,183,586 | 5/1965 | Sellers | 85/5 B X |
| 3,257,720 | 6/1966 | Siler | 151/41.76 X |
| 3,863,421 | 2/1975 | Busch et al. | 52/758 D X |

FOREIGN PATENTS OR APPLICATIONS

| | | | |
|---|---|---|---|
| 464,796 | 5/1950 | Canada | 52/758 D |
| 602,042 | 7/1960 | Canada | 151/41.76 |

Primary Examiner—Roy D. Frazier
Assistant Examiner—Rodney H. Bonck
Attorney, Agent, or Firm—R. S. Sciascia; Henry Hansen; Robert J. Mooney

[57] ABSTRACT

A high strength positive locking fastener for securing structural panels together is disclosed. The fastener includes a stud receptacle and a stud assembly. The stud receptacle is mounted on an inner panel spatially fixed with respect to an outer panel and includes an interiorly threaded basket nut with assembled washer fixedly mounted thereon and a cage which is fastened to the inner panel and which movably receives the basket nut and washer assembly. The stud assembly passes through substantially coaxial openings in the panels and then into the basket nut assembly. The stud assembly includes a threaded stud having a bore therethrough containing a spring loaded plunger with a pair of locking balls resting thereon. To engage the fastener and secure the panels together a tool is used to depress the plunger forcing the balls against a reduced plunger diameter and allowing the stud to pass through the panel openings and into the basket nut. The stud is then threaded into the basket nut and, when the tool is removed, the plunger returns to its fully exended position with the balls resting on a larger plunger diameter thereby preventing the stud assembly from passing through the panel openings. To remove the fastener and separate the panels, the tool is used to depress the plunger allowing the balls to rest against a reduced plunger diameter and the stud is unscrewed from the basket nut.

4 Claims, 13 Drawing Figures

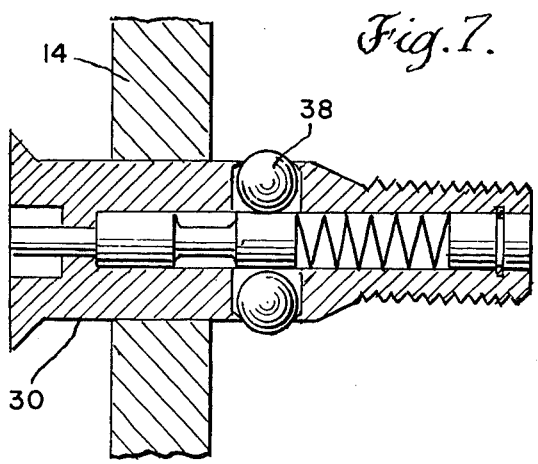
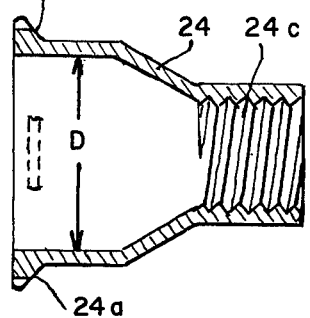
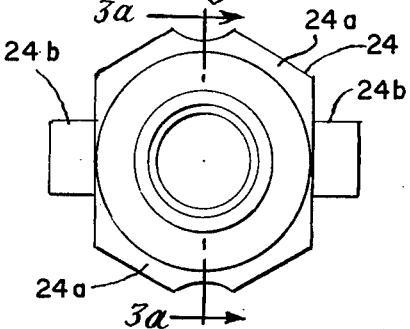
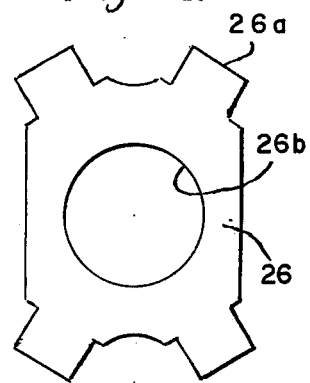
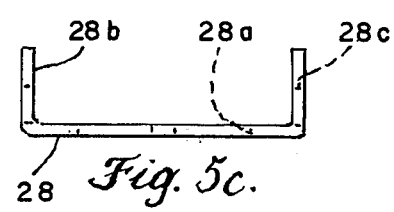
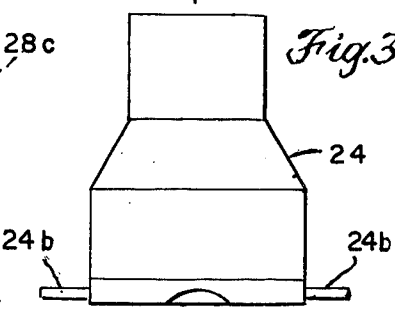
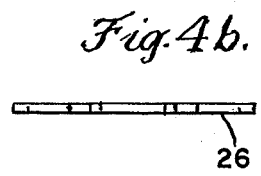
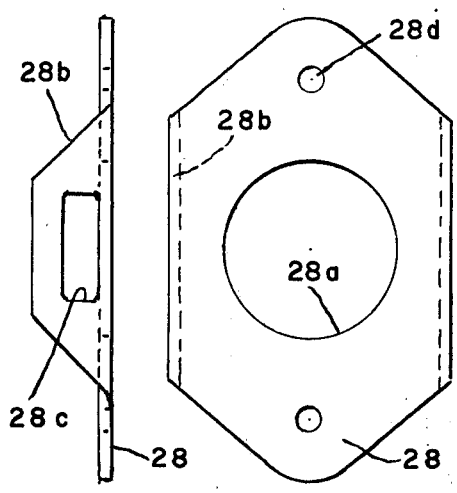
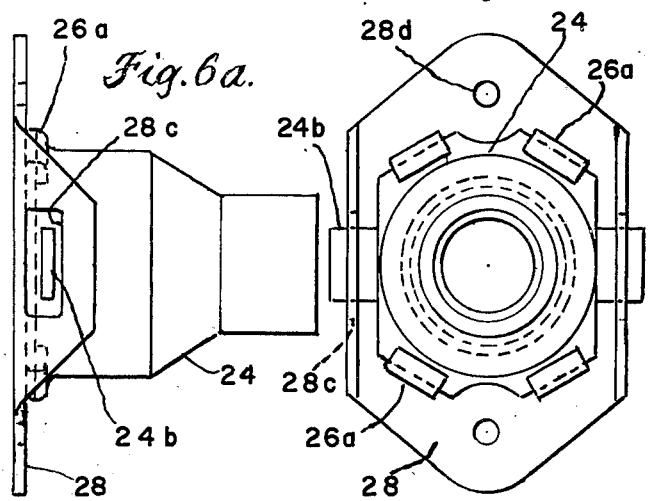

SELF-LOCKING PANEL FASTENER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to panel fasteners of the stud assembly and stud receptacle variety and in particular to panel fasteners having self-locking stud structures and structure to insure retention of the stud portion of the fastener with a removable panel.

Self-locking fasteners are employed for locking two structural members together such as access panels to structural frame members or to other panels. These self-locking fasteners are particularly useful in aircraft and missile installations where it is desired to provide quick access to electronic, hydraulic and other equipment housed therein. Inasmuch as any access panel would ordinarily carry a multiplicity of such self-locking fasteners, they must be capable of quick action, permitting ready removal and ready replacement of the access panel within the shortest possible time. Further, since a considerable number of access panels and fasteners are utilized in any aircraft or missile, another requirement for such fasteners is that they be constructed as inexpensively as possible yet perform under adverse conditions.

Presently used self-locking fasteners normally comprise some type of stud which may or may not be attached to the removable access panel and a complex stud receptor which is attached to an inner panel. Although these panel fasteners are quite useful they do have disadvantages. For example, during aircraft flight, vibrations are set up which tend to loosen the studs from the stud receptors causing the studs to fall away and be lost; during maintenance operations the studs are not positively retained with the access panel and become misplaced or lost.

SUMMARY OF THE INVENTION

Accordingly, it is an object of this invention to provide a panel fastener which includes structure for ensuring a self-locking function when the panels are joined together. It is a further object of this invention to provide a panel fastener which includes structure which ensures that the stud assembly of the panel fastener will be positively retained by a removable access panel. These and other objects are achieved as follows.

A high strength, positive locking, and self-retaining fastener for securing inner panels together is provided. The panels are provided with substantially coaxial openings where at least a predetermined portion of the inner panel opening has a larger diameter than the outer panel opening.

The fastener includes a stud receptacle and stud assembly. The receptacle is mounted on an inner panel spatially fixed with respect to a removable outer panel and includes an interiorly threaded basket nut with a washer fixedly mounted thereon. The washer throat is smaller than the basket nut throat. A cage is fastened to the inner panel and movably receives the basket nut and washer assembly. A working length portion of the stud assembly passes through substantially coaxial holes in the panels and then into the basket nut assembly. The stud assembly includes a threaded stud having a longitudinal bore therethrough containing a spring loaded plunger with a pair of locking balls resting thereon which are movable within a transverse bore in the stud assembly. To engage the fastener and secure the panels together, a tool is used to depress the plunger which forces the balls against a reduced plunger diameter allowing the stud to pass through the panel openings and into the basket nut. The stud is then threaded into the basket nut and when the tool is removed the plunger returns to its fully extended position with the balls resting on a larger plunger diameter diameter thereby preventing the stud assembly from passing through the panel openings. To remove the fastener and separate the panels, the tool is used to depress the plunger allowing the balls to rest against a reduced plunger diameter and the stud assembly is unscrewed from the basket nut. After the stud assembly has passed through the smaller throat of the washer, the balls are permitted to extend into the larger diameter hole in the inner panel to thereby lock the stud assembly to the outer access panel.

Further features and advantages of the invention will become apparent from the following detailed desription when read in conjunction with the accompanying drawings.

BRIEF DESCRITPTION OF THE DRAWINGS

FIGS. 3a, 3b and 3c are detailed views of a basket nut;

FIGS. 4a 4b detailed views of a washer;

FIGS. 5a, 5b and 5c detailed views of a basket nut cage;

FIGS. 6a and 6b are detailed views of an assembled basket nut, washer, and nut cage according to the invention; and FIG. 7 is a cross-sectional view stud assembly of the panel fastener of the present invention showing positive retention of the stud assembly by an access panel removed from an inner panel.

DESCRIPTION OF THE PREFERRED EMBODIMENT

Figure 1:
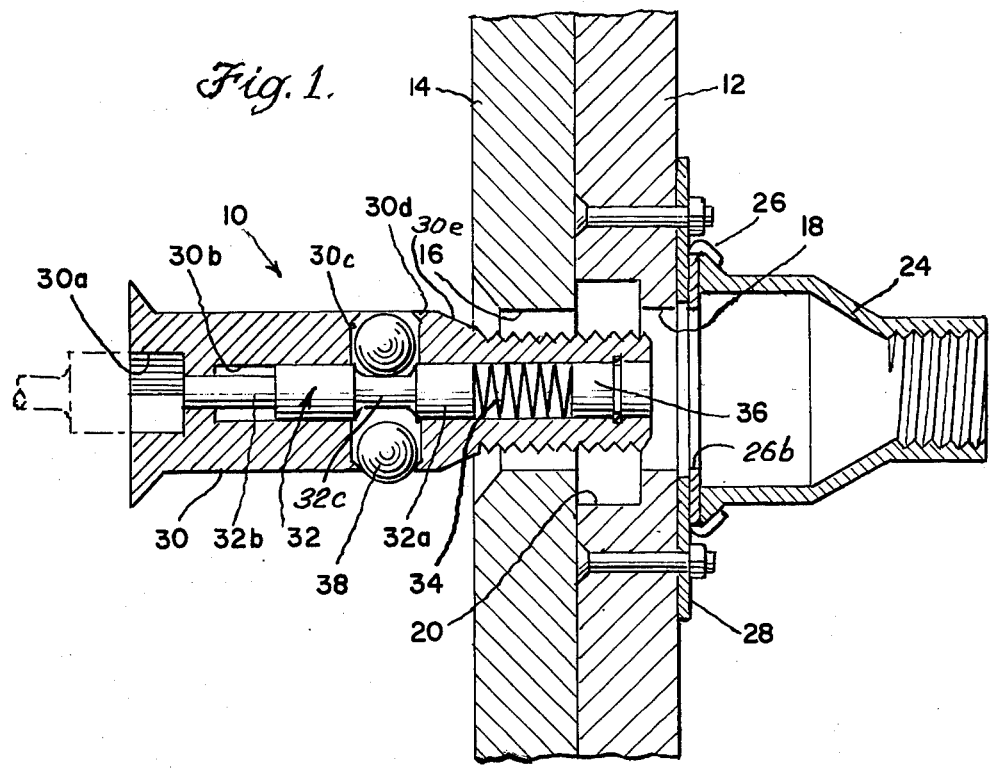
FIG. 1 is a cross-sectional view of two panels prior to securement with a panel fastener according to the invention.
Figure 2:
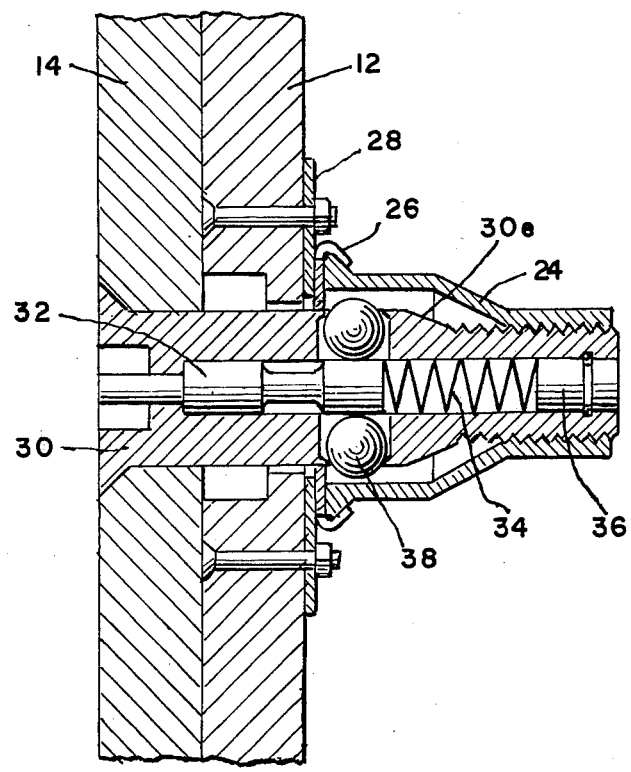
FIG. 2 is a cross-sectional view of the panel fastener joining two panels together.

Referring to FIGS. 1 and 2, the panel fastener 10 of the present invention is shown in conjunction with an inner panel 12 which is spatially fixed relative to a removable outer access panel 14. In practice the inner panel 12 defines an access opening which is covered by the outer panel 14; the outer panel 14 is removably secured to the inner panel 12 by a plurality of fasteners 10 which pass through holes in the outer panel 14 such as hole 16, and also through substantially aligned corresponding holes located around the periphery of the access opening in the fixed inner panel 12, such as hole 18. The hole 18 in the fixed inner panel 12 is provided with a counterbore 20 of larger diameter which abuts the inner side of the removable outer panel 14; the counterbore 20 serves to permit extension of the balls 38 upon stud 30 removal as will be explained hereinbelow.

The panel fastener 10 includes an exteriorly threaded stud assembly 30 which is formed to threadably engage an interiorly threaded floating basket nut 24 which is movably attached to the inner surface of the inner panel 12. As will be explained more fully hereinbelow, the basket nut 24 is fixedly secured to a washer 26 and the basket nut 24 and washer 26 assembly is movably secured to a nut cage 28 which is fixedly secured to the inner panel 12.

The stud assembly 30 includes a head larger in diameter than the outer panel hole 16 containing a recessed tool land 30a; the stud 30 also includes a shank having a longitudinal bore 30b and an intersecting transverse bore 30c therein. The longitudinal bore 30b contains a plunger 32, a spring 34 and a plug 36. The transverse bore 30c contains two movable albeit captured ball detents 38; the bore 30c is lipped or staked, such as at 30d, to allow partial protrusion of the balls 38. The plug 36 is fixedly secured to the sidewalls of the longitudinal bore 30b and serves as an abutment for the spring 34 which normally urges the larger diameter portion 32a of the plunger 32 under the balls 38 as shown in FIGS. 2 and 7. The plunger 32 has an axial extension 32b which normally extends into the recessed tool land 30a when the spring 34 is uncompressed as shown in FIGS. 2 and 7. The tool land 30a may take any convenient shape, e.g., it may be hexagonal.

The stud assembly 30 shank is provided with an annular sloping shoulder 30e which urges the floating basket nut 24 into alignment with the stud assembly 30 upon contact with the rim of the washer hole 26b.

Referring to FIGS. 3a, 3b and 3c a detailed view of the basket nut 24 is shown. The basket nut 24 is a generally bell-shaped housing having four lands 24a and two projecting ears 24b. The four lands 24a serve as attachment points for the ears 26a of the washer 26. (See FIGS. 4a and 4b). The four lands 24a are distributed about the periphery of the basket nut 24 in a manner to assure that there is no relative rotation between the washer 26 and the basket nut 24. The projecting ears 24b are used to movably mount the basket nut 24 in the slots 28c of the nut cage 28. A reduced diameter portion of the basket nut 24 is provided with a series of threads 24c which engage complimentary threads located on the stud 30. An enlarged diameter portion of the basket nut has a throat opening or diameter D that is larger than the diameter of the washer hole 26b and that is large enough to accommodate the stud 30 with the balls 38 in the extended position as shown in FIG. 2. The enlarged diameter portion D of the basket nut also of sufficient length to accommodate variable thickness panels.

Referring to FIGS. 4a and 4b a detailed view of the washer 26 is shown. The washer 26 includes four projecting ears 26a which are formed to be crimped about corresponding lands 24a on the basket nut 24. The washer 26 is provided with a hole 26b whose diameter is slightly larger than the diameter of the stud 30 with the balls 38 retracted but smaller than the diameter of the stud 30 with the balls extended. Ideally, the diameter of the washer hole 26b is substantially equal to the diameter of the hole 18 in the inner panel 12. However, in certain circumstances, e.g., where the inner panel 12 is the relatively soft aluminum skin of an aircraft, the diameter of the hole 18 in the inner panel 12 tends to enlarge after repeated use due to wear. This circumstance is portrayed in FIG. 2. In this circumstance, it is preferable to fabricate the washer 26 from a wear resistant metal such as 17–4 PH steel per military specification MIL-S-81506. Making the washer 26 from a relatively hard alloy ensures that the washer hole 26b diameter and the diameter of the stud 30 remain in proper relation and, more importantly, also insures that the ball detents 38 will abut a relatively unyielding surface when the panels 12, 14 are assembled as shown in FIG. 2.

Referring to FIGS. 5a, 5b and 5c a detailed view of the nut cage 28 is shown. The nut cage 28 is provided with a hole 28a having a diameter equal to or preferably larger than the diameter of the hole 18 in the inner panel 12. With respect to the basket nut 24 diameter D and the washer hole 26b diameter, the nut cage hole 28a diameter is smaller and larger, repectively. The nut cage 28 is provided with two integral uprights 28b which each have a slot 28c therein. The slots 28c are dimensionally larger than the ears 24b on the basket nut 24. The nut cage 28 is also provided with two holes 28d. The holes 28d are used to fixedly secure the nut cage 28 to the inner panel 12 by means of screws or bolts or other conventional means. Referring to FIG. 6a and 6b two detailed views of the assembled basket nut 24, washer 26, and nut cage 28 are shown. FIGS. 6a and 6b clearly show how the washer 26 is fixedly secured to the basket nut 24 with the washer ears 26a bent over and firmly pressed against the lands 24a. FIGS. 6a and 6b further show how the basket nut 24 and washer 26 assembly is movably secured to the nut cage 28 by means of the ears 24b loosely reposing within the slots 28c. The slots 28c are dimensionally larger than the basket nut ears 24b which permits relative motion of the basket nut 24 and washer 26 assembly with respect to the spatially fixed nut cage 28. In this manner the basket nut 24 is rendered floating to allow for slight misalignment between the holes 16 and 18.

OPERATION OF THE DEVICE

Referring to FIG. 1 the panel 14 is shown pressed against the fixed inner panel 12 and the stud 30 is shown partially inserted through the holes 16 and 18. A tool (shown dotted) is inserted within the recessed tool land 30a to thereby depress the plunger 32 which compresses the spring 34 to thereby bring the reduced diameter portion 32c of the plunger 32 beneath the balls 38. The balls 38 are therefore free to retract into the confines of the stud 30; and they do so by falling inwardly due to gravity or by being pushed inwardly by contact with their structure, e.g., the sides of hole 16. As the stud 30 is inserted through the holes 16, 18, the stud shoulder 30e ensures alignment of the stud 30 with the floating basket nut 24 and washer 26 assembly by contact with the rim of the washer hole 26b. The tool is used to rotate the stud assembly 30 to thereby threadably engage the stud 30 with the basket nut 24 as shown in FIG. 2. When the stud 30 is securely threaded to the basket nut 24 the tool is removed from the tool recess 30a and the spring 34 urges the plunger 32 toward the left as shown in FIG. 2 to thereby present the enlarged diameter portion 32a of the plunger 32 beneath the balls 38. The balls 38 are urged outwardly and partially protrude from the surface of the stud 30. As best seen in FIG. 2, the balls 38 contact the washer 26 to thereby form a positive lock. That is, should the stud 30 tend to back out of the basket nut 24, due to vibration for example, it cannot become completely unthreaded from the basket nut 24 because the balls 38 either initially or eventually abut against the washer 26 to thereby prevent the disengagement of the stud 30 from the basket nut 24. This abutting, positive lock, condition is ensured by requiring the washer hole 26b diameter to be smaller than the diameter sum of the balls 38 and enlarged portion 32a of the plunger 32, i.e., smaller than the diameter of the stud 30 when the balls 38 are in the extended position of FIG. 2.

The stud 30 is disengaged from the basket nut 24 and the outer panel 14 is removed from the inner panel 12 in the following manner. The tool is inserted within the tool recess 30a to thereby depress the plunger 32 which compresses the spring 34 to there bring the reduced diameter portion 32c of the plunger 32 beneath the balls 38. The balls 38 are therefore free to retract into the confines of the transverse bore 30c in the stud 30. The tool is used to rotate the stud 30 until the threads of the stud 30 have disengaged from the threads of the basket nut 24 and the stud 30 has been partially withdrawn to the extent that the centerline of the transverse bore 30c is located within the counterbore 20 region. The tool is thereafter removed which permits the spring 34 to expand to thereby urge the enlarged diameter portion 32a of the plunger 32 beneath the balls 38 to thereby urge the balls 38 outwardly so as to protrude into the counterbore 20 region. The outer panel 14 can now be removed from the inner panel 12. The stud assembly remains a captive of the outer panel 14, as shown in FIG. 7, hence the stud 30 is less likely to be lost during maintenance operations since it is positively retained with the access panel 14.

It is clear from the foregoing that several modifications may be made within the scope of the invention. For example, in aircraft access panel applications, the stud 30 desirably carries part of the shear load on the panels 12, 14. In those applications where it is not necessary for the stud 30 to carry shear loads, the inner panel counterbore 20 may be eliminated and the hole 18 may be enlarged to a diameter greater than the diameter of the stud 30 with the balls 38 extended.

As a further example, the basket nut 24 and washer 26 need not be fabricated as individual elements. It is clear that that the basket nut assembly (i.e., the basket nut 24 with affixed washer 26) may be made as one piece provided that it forms throat comprising first and second juxtaposed openings wherein the first opening is smaller than and the second opening is larger than the effective diameter of the stud assembly 30 when the balls 38 are in the extended position shown in FIGS. 2 and 7.

An improved panel fastener 10 has been disclosed. The fastener 10 incorporates structure which assures that the stud 30 will not disengage from the basket nut 24 due to vibration. The fastener also incorporates structure which assures that the stud 30 will be retained and not become displaced from the removed outer panel 14. It is also clear that three or more balls 38 and corresponding transverse bores may be used.

Obviously many modifications and variations of the present invention are possible in the light of the above teachings. It is therefore to be understood that within the scope of the appended claims the invention may be practiced otherwise than as specifically described.

I claim:

1. A fastener assembly adapted to extend through substantially aligned corresponding openings of two panels for joining said panels comprising:
   a stud having a greater diameter shank portion, a threaded shank portion of smaller major diameter, a sloping shank shoulder between said shank portions, a head of greater diameter than and located at the end of the stud nearest said greater diameter shank portion, a longitudinal bore, and a transverse bore within said greater diameter shank portion and intersecting said longitudinal bore;
   a plurality of ball detents movable in said transverse bore between a retracted position within said stud and a protruding position;
   locking means movable in said longitudinal bore for movement between a first position wherein said ball detents are urged to said protruding position and a second position wherein said ball detents are free to assume said retracted position; and
   a stud receptacle secured to one of said panels including a basket nut member movably secured to a nut cage, said basket nut member having a reduced diameter threaded portion threadingly engaging said smaller diameter threaded shank portion of said stud, said basket nut member further forming first and second juxtaposed holes wherein the diameter of said first hole engages said ball detents while in said protruding position, and wherein the diameter of said hole will admit said greater diameter shank portion of said stud while said ball detents are in said protruding position.

2. A fastener assembly as defined in claim 1 wherein said locking means comprises:
   a plunger having a smaller diameter portion juxtaposed to a larger diameter portion slidable in said longitudinal bore;
   a plug in the end of said longitudinal bore in said threaded shank portion; and
   a spring in said longitudinal bore abutting said plug and said plunger and normally urging said larger diameter portion of said plunger adjacent to said ball detents to urge said ball detents to said protruding position.

3. In a joint:
   a first panel having a first hole;
   a stud having a greater diameter shank portion slidable in said first hole, a threaded shank portion of smaller major diameter, a sloping shank shoulder between said shank portions, a head larger than said hole of said first panel and located at the end of the stud nearest said greater diameter shank portion, a longitudinal bore, and a transverse bore within said greater diameter shank portion and intersecting said longitudinal bore;
   a plurality of ball detents moveable in said transverse bore between a retracted position within said stud and a protruding position which together with the diameter of said greater diameter portion of said stud form a width greater than the diameter of said first hole;
   locking means movable in said longitudinal bore for movement between a first position wherein said ball detents are urged to said protruding position and a second position wherein said ball detents are free to assume said retracted position;
   a second panel abutting said first panel and having a second hole axially aligned with first hole of said first panel, of a diameter which will admit said greater diameter portion of said stud while said ball detents are in said retracted position but not while said ball detents are in said protruding position, having a counterbore at the face abutting said first panel of a diameter which will admit said greater diameter portion of said stud while said ball detents are in said protruding position; and a stud receptacle secured to the face of said second panel opposite the face abutting said first panel including a basket nut member movably secured to a nut cage, said basket nut member having a reduced diameter threaded portion threadingly engaging said smaller diameter threaded shank portion of said stud, said basket nut member further forming third and fourth juxtaposed holes wherein the diameter of said third hole engages said ball detents while in said protruding position, and wherein the diameter of said fourth hole will admit said greater diameter shank portion of said stud while said ball detents are in said protruding position.

4. A joint as defined in claim 3 wherein said locking means comprises:
- a plunger having a smaller diameter portion juxtaposed to a larger diameter portion slidable in said longitudinal bore;
- a plug in the end of said longitudinal bore in said threaded shank portion; and
- a spring in said longitudinal bore abutting said plug and said plunger and normally urging said diameter portion of said plunger adjacent to said ball detents to urge said ball detents to said protruding position.

* * * * *